UNITED STATES PATENT OFFICE.

FRIEDRICH E. SCHMIDT, OF NEW YORK, N. Y.

IMPROVEMENT IN PREPARING VEGETABLE DYE-STUFFS.

Specification forming part of Letters Patent No. 15,361, dated July 15, 1856.

*To all whom it may concern:*

Be it known that I, FRIEDRICH EMIL SCHMIDT, of the city, county, and State of New York, have invented a new and improved mode of preparing permanent durable pigments from the juice of buck-berries, which has been used as a dye-stuff only to a very limited extent, as hitherto dyers did not succeed in making the colors produced by it durable and non-fading; and I do hereby declare that the following is a full and exact description thereof.

The nature of my invention consists in subjecting the juice of the *Bacca phytolaccæ decandriæ,* generally known by the name of buckberry, to a treatment by which the red pigment of the juice is so altered that it will give, with or without mordants, durable colors in red or violet, which may be fixed on wool, cotton, silk, &c.

To enable others skilled in the art to make and use my invention, I will proceed to describe its operation.

The ripe black buck-berries (*Bacca phytolaccæ decandriæ*) are, in order to make a red pigment, crushed, the juice pressed out from the husks, boiled for about half an hour, then withdrawn from the fire and cooled. The boiling itself is not obsolutely necessary; but I have observed that after boiling the pigment is quicker and in better shade developed than without previous boiling. After boiling the red extract is filled into bottles or other vessels, which can be hermetically closed; and it is very essential to keep these vessels perfectly closed, so as to admit no atmospheric air, which invariably will impair the shade of the pigment. In these vessels I keep the extract for about two months, although even less time will give a satisfactory product. The extract undergoes in these closed vessels an alteration, so as to generate and develop a pigment different from that which exists in the fresh juice, and the product obtains at last the property to give a durable red color, which, with alum or other mordants, according to the desired shade, may be fixed on wool, cotton, or silk.

If it is desired to produce violet shades, (pensée,) the buck-berries are to be crushed and the whole mass, juice and husks together, put into a barrel, which is kept uncovered in a chamber having a temperature of at least 60° of Fahrenheit. After a few days the liquor is progressing to a state of fermentation, which lasts from three to four weeks. The fermentation being over, the liquor is ready for use, and may be directly used with alum, (*Cremor tartari,*) or other chemicals with which the pigment combines, and may be fixed advantageously on wool, cotton, silk, or other fabrics.

I am well aware that buck-berry juice, without further preparation, has been used as a dye-stuff, of which the colors are known to fade out very soon, and I do not claim the use generally; but

What I claim as my invention, and desire to secure by Letters Patent, is—

The treatment above described of the juice previous to its use for dyeing, to produce permanent and durable colors.

FRIEDRICH EMIL SCHMIDT.

Witnesses:
   JUL. E. SCHWABE,
   F. GOERIG.